(12) United States Patent
Negishi et al.

(10) Patent No.: US 12,286,356 B2
(45) Date of Patent: *Apr. 29, 2025

(54) COLLOIDAL SILICA AND METHOD FOR PRODUCING SAME

(71) Applicant: FUSO CHEMICAL CO., LTD., Osaka (JP)

(72) Inventors: Yuma Negishi, Fukuchiyama (JP); Hideki Otsuki, Fukuchiyama (JP); Hiroaki Yamashita, Fukuchiyama (JP); Toshiki Chiba, Fukuchiyama (JP)

(73) Assignee: FUSO CHEMICAL CO., LTD., Osaka (JP)

( * ) Notice: Subject to any disclaimer, the term of this patent is extended or adjusted under 35 U.S.C. 154(b) by 590 days.

This patent is subject to a terminal disclaimer.

(21) Appl. No.: 17/436,126

(22) PCT Filed: Feb. 26, 2020

(86) PCT No.: PCT/JP2020/007579
§ 371 (c)(1),
(2) Date: Sep. 3, 2021

(87) PCT Pub. No.: WO2020/179556
PCT Pub. Date: Sep. 10, 2020

(65) Prior Publication Data
US 2022/0144649 A1 May 12, 2022

(30) Foreign Application Priority Data
Mar. 6, 2019 (JP) .................................. 2019-040718

(51) Int. Cl.
*C01B 33/145* (2006.01)
(52) U.S. Cl.
CPC ........ *C01B 33/145* (2013.01); *C01P 2004/03* (2013.01); *C01P 2004/64* (2013.01); *C01P 2006/10* (2013.01)

(58) Field of Classification Search
None
See application file for complete search history.

(56) References Cited

U.S. PATENT DOCUMENTS

| | | | |
|---|---|---|---|
| 2,680,721 | A | 6/1954 | Broge et al. |
| 4,301,027 | A | 11/1981 | Blumcke et al. |
| 8,529,787 | B2 | 9/2013 | Higuchi et al. |
| 9,422,457 | B2 | 8/2016 | Grumbine et al. |
| 11,691,885 | B2 | 7/2023 | Omokawa et al. |
| 12,162,764 | B2 | 12/2024 | Fujimura et al. |
| 2009/0253813 | A1 | 10/2009 | Ishiguri et al. |
| 2010/0071272 | A1* | 3/2010 | Higuchi ............... C09K 3/1409 51/308 |
| 2010/0311871 | A1 | 12/2010 | Suemura et al. |
| 2011/0163262 | A1* | 7/2011 | Higuchi .................. C01B 33/14 252/79.1 |
| 2011/0209413 | A1* | 9/2011 | Nishida ................ C09K 3/1445 51/308 |
| 2013/0345461 | A1 | 12/2013 | Bekiarian et al. |
| 2014/0335762 | A1* | 11/2014 | Tamai ............... H01L 21/31053 451/28 |
| 2015/0376018 | A1 | 12/2015 | Suemura et al. |
| 2016/0130152 | A1 | 5/2016 | Yoshitake et al. |
| 2016/0145110 | A1 | 5/2016 | Suemura et al. |
| 2017/0001870 | A1 | 1/2017 | Yoshitake et al. |
| 2018/0155591 | A1* | 6/2018 | Kumazawa .......... C09K 3/1409 |
| 2018/0208474 | A1 | 7/2018 | Kim et al. |
| 2019/0010059 | A1 | 1/2019 | Ashitaka et al. |
| 2019/0127230 | A1 | 5/2019 | Taguchi et al. |
| 2020/0180968 | A1 | 6/2020 | Ashitaka et al. |
| 2021/0061667 | A1 | 3/2021 | Omokawa et al. |
| 2022/0127150 | A1 | 4/2022 | Yamashita et al. |
| 2022/0177318 | A1 | 6/2022 | Otsuki et al. |

FOREIGN PATENT DOCUMENTS

| | | | | |
|---|---|---|---|---|
| CN | 102066252 | A | | 5/2011 |
| CN | 105283413 | A | | 1/2016 |
| CN | 105813977 | A | | 7/2016 |
| CN | 107848811 | A | | 3/2018 |
| CN | 112299425 | A | * 2/2021 | ............. B82Y 40/00 |
| JP | 6-316407 | A | | 11/1994 |
| JP | 2002-145609 | A | | 5/2002 |

(Continued)

OTHER PUBLICATIONS

Machine Translation for WO-2019049907-A1 (Year: 2019).*
Machine Translation for CN-112299425-A (Year: 2021).*
International Search Report dated Mar. 31, 2020, issued in counterpart application No. PCT/JP2020/007579 (3 pages).
Sears, "Determination of Specific Surface Area of Colloidal Silica by Titration with Sodium Hydroxide", Analytical Chemistry, 1956, vol. 28, No. 12, pp. 1981-1983 (3 pages).
International Search Report dated Mar. 31, 2020, issued in International Application No. PCT/JP2020/007574 (counterpart to U.S. Appl. No. 17/436,335). (2 pages).

(Continued)

Primary Examiner — Michael Forrest
(74) Attorney, Agent, or Firm — WHDA, LLP (57) ABSTRACT

A colloidal silica is disclosed that contains, with high purity, silica particles having an appropriate particle density, a high aggregation ratio, and a high alkoxy group content, and to provide a method for producing the colloidal silica in a simple manner at reduced costs. The colloidal silica containing silica particles is disclosed, wherein the silica particles have an average primary particle size of 33 nm or more, an aggregation ratio of 1.2 or more, and a particle density of 1.95 or more, the silica particles contain 1000 ppm by mass or more of alkoxy groups per gram of the silica particles, the proportion of the number of silica particles having an equivalent circle diameter under 20 nm is less than 15%, and the silica particles contain a primary amine in an amount of 5 μmol or more per gram of the silica particles.

9 Claims, 3 Drawing Sheets (56) References Cited

FOREIGN PATENT DOCUMENTS

| | | |
|---|---|---|
| JP | 2004-315300 A | 11/2004 |
| JP | 2007-153732 A | 6/2007 |
| JP | 2009-184856 A | 8/2009 |
| JP | 2010-058985 A | 3/2010 |
| JP | 2011-042522 A | 3/2011 |
| JP | 2011-201719 A | 10/2011 |
| JP | 2013-082584 A | 5/2013 |
| JP | 2016-8147 A | 1/2016 |
| JP | 2016-008157 A | 1/2016 |
| JP | 2016-130290 A | 7/2016 |
| JP | 2017-154914 A | 9/2017 |
| JP | 2018-090798 A | 6/2018 |
| JP | 6968632 B2 | 11/2021 |
| TW | 201509808 A | 3/2015 |
| TW | 202039367 A | 11/2020 |
| TW | 202043149 A | 12/2020 |
| WO | 2008/123373 A1 | 10/2008 |
| WO | 2010/035613 A1 | 4/2010 |
| WO | 2010/052945 A1 | 5/2010 |
| WO | 2012/138365 A1 | 10/2012 |
| WO | 2017038777 A1 | 3/2017 |
| WO | 2017/170660 A1 | 10/2017 |
| WO | WO-2019049907 A1 * | 3/2019 ........... C01B 33/152 |

OTHER PUBLICATIONS

Zhou et al., "Study on surface modification of inorganic nano-SiO2 particles", New Chemical Materials, 2015, vol. 43, No. 2, pp. 167-170, with English abstract, cited in CN Office Action dated Nov. 30, 2023. (4 pages).

Non-Final Office Action dated Jul. 23, 2024, issued in U.S. Appl. No. 17/436,335. (26 pages).

International Search Report dated Mar. 31, 2020, issued in counterpart International Application No. PCT/JP2020/007580 (3 pages).

Chinese Doctoral Dissertations & Master's Theses Full-text DatabaseEngineering Science and Technolog No. 1, 2016, with English abstract. (79 pages) cited in CN Office Action dated Nov. 17, 2023.

Non-Final Office Action dated Jul. 2, 2024, issued in U.S. Appl. No. 17/436,177 (26 pages).

Non-Final Office Action dated Jan. 7, 2025, issued in U.S. Appl. No. 17/436,177. (17 pages).

\* cited by examiner

COLLOIDAL SILICA AND METHOD FOR PRODUCING SAME

TECHNICAL FIELD

The present invention relates to colloidal silica and a method for producing the colloidal silica. In particular, the present invention relates to colloidal silica that contains silica particles having an average primary particle size of 33 nm or more, an aggregation ratio of 1.2 or more, and a particle density of 1.95 or more, and containing alkoxy groups, and a method for producing the colloidal silica.

BACKGROUND ART

Colloidal silica, which is obtained by dispersing fine silica particles in a medium such as water, is used as a physical property improver in the fields of, for example, paper, textiles, and steel, and also used as an abrasive for electronic materials such as semiconductor wafers. The silica particles dispersed in colloidal silica used for these applications are required to have a high particle density and a high aggregation ratio.

To produce colloidal silica that can meet the above requirements, for example, a production method in which a hydrolyzed solution obtained by hydrolyzing an alkoxysilane is added to a mother liquor that contains an alkaline catalyst etc. is disclosed (see, for example, Patent Literature (PTL) 1).

However, according to the production method disclosed in PTL 1, an alkoxysilane is hydrolyzed to prepare a hydrolyzed solution, and the hydrolyzed solution is then added to the mother liquor. Although this method can produce particles with excellent compactness and a high particle density, the overly high particle density poses a problem of increasing defects (e.g., scratches) on the surface of a substrate such as of a polished object. Further, the production process of this method takes a long time, involves multiple steps, and is complicated and costly.

Other than the above method, a production method in which an alkoxysilane is added to a mother liquor without hydrolysis to produce colloidal silica is disclosed (see, for example, PTL 2).

However, PTL 2 nowhere discloses a method for producing silica particles with a high aggregation ratio and a high particle density. Further, the colloidal silica obtained by the production method of PTL 2 cannot easily achieve high abrasiveness, leaving room to consider further improvement in abrasiveness.

Accordingly, development of colloidal silica with excellent abrasiveness is desired, and thus, development of a production method that enables simple production of the colloidal silica and reduces production costs is desired.

CITATION LIST

Patent Literature

PTL 1: WO 2010/035613
PTL 2: JP2016-008157A

SUMMARY OF INVENTION

Technical Problem

An object of the present invention is to provide colloidal silica that contains silica particles containing alkoxy groups and having an appropriate particle density, and provide a production method that enables simple production of the colloidal silica and reduces production costs.

Solution to Problem

The present inventors conducted extensive research to achieve the above objects, and consequently found that the objects can be achieved by a colloidal silica comprising silica particles, wherein the silica particles have an average primary particle size of 33 nm or more, an aggregation ratio of 1.2 or more, and a particle density of 1.95 or more, the silica particles contain 1000 ppm by mass or more of alkoxy groups per gram of the silica particles, the proportion of the number of silica particles having an equivalent circle diameter under 20 nm is less than 15%, and the silica particles contain a primary amine in an amount of 5 μmol or more per gram of the silica particles. The present invention has thus been completed.

The typical subject matter of the present invention is the following.

1. A colloidal silica comprising silica particles, wherein
   the silica particles have an average primary particle size of 33 nm or more, an aggregation ratio of 1.2 or more, and a particle density of 1.95 or more,
   the silica particles contain 1000 ppm by mass or more of alkoxy groups per gram of the silica particles,
   the proportion of the number of silica particles having an equivalent circle diameter under 20 nm is less than 15%, and
   the silica particles contain a primary amine in an amount of 5 μmol or more per gram of the silica particles.
2. The colloidal silica according to Item 1, wherein the silica particles have a particle density of 1.95 or more and 2.20 or less.
3. The colloidal silica according to Item 1 or 2, wherein the silica particles have an organic functional group on the surface, the organic functional group being represented by the following formula (1)

$$-(CH_2)_n-R^3 \qquad (1)$$

wherein n represents an integer of 0 or more, and $R^3$ represents a functional group.
4. The colloidal silica according to any one of Items 1 to 3, wherein the silica particles have an organic cationic functional group on the surface.
5. The colloidal silica according to Item 4, wherein the silica particles have an amino group on the surface.
6. The colloidal silica according to any one of Items 1 to 3, wherein the silica particles have an organic anionic functional group on the surface.
7. The colloidal silica according to Item 6, wherein the silica particles have a sulfo group on the surface.
8. A method for producing colloidal silica, the method comprising in series
   (1) step 1 of preparing a mother liquor containing an alkaline catalyst and water,
   (2) step 2 of adding an alkoxysilane to the mother liquor to prepare a mixed liquid,
   (3) step 3 of adding an alkaline catalyst to the mixed liquid to prepare a seed particle dispersion, and
   (4) step 4 of adding water and an organic solvent to the seed particle dispersion, and then adding an alkoxysilane,
   wherein the alkaline catalysts are a primary amine.
9. The production method according to Item 8, comprising, between step 3 and step 4, (3.5) step 3.5 of adding water to the seed particle dispersion obtained in step 3 and then adding an alkoxysilane thereto to prepare a seed particle dispersion.

Advantageous Effects of Invention

The silica particles contained in the colloidal silica according to the present invention have an average primary particle size of 33 nm or more, a high aggregation ratio, an appropriate particle density, and a high content of alkoxy groups, with the proportion of the number of silica particles having an equivalent circle diameter of under 20 nm being less than 15%, and the silica particles also contain primary amines. Thus, the colloidal silica can exhibit a high polishing rate and a low level of defectiveness when used as an abrasive. The method for producing colloidal silica according to the present invention also enables simple production of the colloidal silica and reduces production costs.

DESCRIPTION OF EMBODIMENTS

The following describes the colloidal silica and the method for producing the colloidal silica according to the present invention in detail.

The colloidal silica according to the present invention contains silica particles that have an average primary particle size of 33 nm or more, an aggregation ratio of 1.2 or more, and a particle density of 1.95 or more, with the proportion of the number of silica particles having an equivalent circle diameter of under 20 nm silica being less than 15%. Thus, the colloidal silica is excellent in abrasiveness. Additionally, the colloidal silica according to the present invention has a high content of alkoxy groups in silica particles. Thus, the colloidal silica can reduce defects (e.g., scratches) on the surface of a substrate such as of a polished object. The colloidal silica according to the present invention may contain deformed silica particles.

The production method according to the present invention prepares a mother liquor containing an alkaline catalyst and water in step 1 and adds an alkoxysilane to the mother liquor to prepare a mixed liquid in step 2. Thus, the production method according to the present invention does not require that an aqueous silicic acid solution be prepared by hydrolyzing an alkoxysilane, and that the prepared solution be added to a mother liquor. Therefore, the method can easily produce colloidal silica containing silica particles that have a high aggregation ratio, an appropriate particle density, and a high alkoxy group content, and that contain primary amines, with the proportion of the number of silica particles having an equivalent circle diameter of under 20 nm being less than 15%. The production method according to the present invention also reduces production costs due to having fewer steps. Additionally, because the production method according to the present invention adds in step 2 an alkoxysilane to the mother liquor containing an alkaline catalyst and water prepared in step 1, and then further adds an alkaline catalyst to prepare seed particles in step 3, the seed particles are prone to deformation; the seed particles are also grown in step 4. Thus, the production method can easily produce colloidal silica excellent in abrasiveness that contain, with high purity, silica particles that have an average primary particle size of 33 nm or more, an aggregation ratio of 1.2 or more, a particle density of 1.95 or more, and 1000 ppm by mass or more of alkoxy groups per gram of the silica particles, with the proportion of the number of silica particles having an equivalent circle diameter of under 20 nm being less than 15%, and that contain primary amines in an amount of 5 µmol or more per gram of the silica particles.

1. Colloidal Silica

The colloidal silica according to the present invention contains silica particles that have an average primary particle size of 33 nm or more, an aggregation ratio of 1.2 or more, a particle density of 1.95 or more, and 1000 ppm by mass or more of alkoxy groups per gram of the silica particles, with the proportion of the number of silica particles having an equivalent circle diameter of under 20 nm being less than 15%, and that contain primary amines in an amount of 5 µmol or more per gram of the silica particles.

The silica particles in the colloidal silica have an average primary particle size of preferably 33 nm or more, and more preferably 38 nm or more. A lower limit of the average primary particle size of silica particles falling within these ranges further increases the abrasiveness of the colloidal silica according to the present invention. The silica particles also have an average primary particle size of preferably 200 nm or less, and more preferably 100 nm or less. An upper limit of the average primary particle size of silica particles falling within these ranges further suppresses the formation of scratches on a polished object.

In the present specification, the average primary particle size of the silica particles contained in the colloidal silica can be measured by the following measurement method. Specifically, colloidal silica is pre-dried on a hot plate and then heated at 800° C. for 1 hour to prepare a measurement sample. The BET specific surface area of the prepared measurement sample is measured. The average primary particle size (nm) of silica particles in the colloidal silica is calculated by using the value of 2727/BET specific surface area ($m^2/g$), regarding the density of silica particles as 2.2.

The silica particles in the colloidal silica have an average secondary particle size of preferably 40 nm or more, more preferably 50 nm or more, and still more preferably 60 nm or more. A lower limit of the average secondary particle size of silica particles falling within these ranges further increases the abrasiveness of the colloidal silica according to the present invention. The silica particles have an average secondary particle size of preferably 400 nm or less, and more preferably 300 nm or less. An upper limit of the average secondary particle size of silica particles falling within these ranges further suppresses the formation of scratches on a polished object.

In the present specification, the average secondary particle size of silica particles in the colloidal silica can be measured by the following measurement method. Specifically, colloidal silica is added to a 0.3 wt % citric acid aqueous solution and homogenized to prepare a dynamic-light-scattering measurement sample. The secondary particle size of the measurement sample is measured by dynamic light scattering (ELSZ-2000S, produced by Otsuka Electronics Co., Ltd.).

The silica particles in the colloidal silica have an aggregation ratio of preferably 1.2 or more, more preferably 1.4 or more, still more preferably 1.5 or more, and particularly preferably 1.8 or more. A lower limit of the aggregation ratio of the silica particles falling within these ranges further increases the abrasiveness of the colloidal silica according to the present invention. The silica particles also have an aggregation ratio of preferably 5.5 or less, and more preferably 5.0 or less. An upper limit of the aggregation ratio of the silica particles falling within these ranges further suppresses the formation of scratches on a polished object.

In the present specification, the aggregation ratio of the silica particles in the colloidal silica is a value determined by dividing the average secondary particle size by the average primary particle size of the silica particles in the colloidal silica.

The content of alkoxy groups in the silica particles is preferably 1000 ppm by mass or more, more preferably 2500 ppm by mass or more, and still more preferably 4000 ppm by mass or more, per gram of the silica particles. A lower limit of the content of alkoxy groups falling within these ranges further suppresses the formation of scratches on a polished object. The content of alkoxy groups in the silica particles is also preferably 15000 ppm by mass or less, more preferably 12000 ppm by mass or less, and still more preferably 10000 ppm by mass or less. An upper limit of the content of alkoxy groups falling within these ranges further increases the abrasiveness of the colloidal silica according to the present invention.

The content of alkoxy groups can be measured by the following method. Specifically, colloidal silica is centrifuged at 215000 G for 90 minutes, and the supernatant is discarded. The solids are vacuum-dried at 60° C. for 90 minutes. 0.5 g of the obtained dry silica solids is weighed and added to 50 mL of a 1M aqueous sodium hydroxide solution, followed by heating the mixture at 50° C. for 24 hours with stirring to dissolve silica. The silica solution is analyzed by gas chromatography to determine the alcohol content, which is taken as the content of alkoxy groups. The detector for use in gas chromatography is a flame ionization detector (FID). Analysis by gas chromatography is performed in accordance with JIS K0114.

The proportion of the number of silica particles having an equivalent circle diameter of under 20 nm in the colloidal silica according to the present invention is preferably less than 15%, and more preferably less than 10%, based on the total number of silica particles. An upper limit of the proportion of the number of silica particles having an equivalent circle diameter of under 20 nm falling within these ranges leads to fewer small particles, thus further increasing the abrasiveness of the colloidal silica according to the present invention.

The proportion of the number of silica particles having an equivalent circle diameter of under 20 nm can be measured by the following measurement method. Specifically, 100 primary particles contained in colloidal silica are observed with a scanning electron microscope (SEM: 50,000-times magnification), and the number of primary particles having an equivalent circle diameter of under 20 nm is determined by image analysis, followed by showing the proportion of the number in percentage relative to the number of primary particles measured for their equivalent circle diameter by SEM.

The silica particles contained in the colloidal silica according to the present invention preferably contain a primary amine. The primary amine is, although not particularly limited to, preferably an amine represented by the following formula (2).

$$NH_2-R^1 \quad (2)$$

wherein $R^1$ represents an optionally substituted $C_{1-12}$ alkyl group.

In formula (2), $R^1$ represents an optionally substituted $C_{1-12}$ alkyl group. The alkyl group may be linear, branched, or cyclic. The number of carbon atoms of a linear or branched alkyl group may be 1 to 12, preferably 1 to 8, and more preferably 1 to 6. Examples of linear alkyl groups include a methyl group, an ethyl group, a propyl group, a butyl group, a pentyl group, a hexyl group, a heptyl group, and an octyl group. Examples of branched alkyl groups include an isopropyl group, a 1-methylbutyl group, a 2-methylbutyl group, a 3-methylbutyl group, a 1,1-dimethylpropyl group, a 1,2-dimethylpropyl group, a 2,2-dimethylpropyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 1-methyl-1-ethylpropyl group, a 2-methyl-2-ethylpropyl group, a 1-ethylbutyl group, a 2-ethylbutyl group, a 1-ethylhexyl group, a 2-ethylhexyl group, a 3-ethylhexyl group, a 4-ethylhexyl group, and a 5-ethylhexyl group. Preferable linear or branched alkyl groups include an n-propyl group, an n-hexyl group, a 2-ethylhexyl group, and an n-octyl group. The number of carbon atoms of a cyclic alkyl group may be, for example, 3 to 12, and preferably 3 to 6. Examples of cyclic alkyl groups include a cyclopropyl group, a cyclobutyl group, a cyclopentyl group, a cyclohexyl group, a cycloheptyl group, and a cyclooctyl group. Preferable cyclic alkyl groups include a cyclohexyl group.

The alkyl group represented by $R^1$ in formula (2) is optionally substituted. The number of substituents may be, for example, 0, 1, 2, 3, or 4, preferably 0, 1, or 2, and more preferably 0 or 1. An alkyl group with 0 substituents means an unsubstituted alkyl group. Examples of substituents include a $C_{1-3}$ alkoxy group (e.g., a methoxy group, an ethoxy group, a propoxy group, and an isopropoxy group). However, the hydroxyl group and unsubstituted amino group are excluded from the substituents. In an alkyl group having multiple substituents, the substituents may be the same or different.

In an embodiment, $R^1$ in formula (2) is an optionally substituted $C_{1-8}$ (preferably $C_{1-5}$) linear or branched alkyl group. In another embodiment, $R^1$ is a $C_{1-8}$ (preferably $C_{1-5}$) linear or branched alkyl group optionally substituted with a $C_{1-3}$ alkoxy group.

The primary amine in an embodiment includes at least one amine selected from the group consisting of 3-ethoxypropylamine, pentylamine, hexylamine, and cyclohexylamine. Of these, 3-ethoxypropylamine is more preferable from the standpoint of the ease of deforming silica particles.

The primary amines may be added singly, or in a combination of two or more.

The content of the primary amine in the silica particles is preferably 5 μmol or more, more preferably 10 μmol or more, and still more preferably 20 μmol or more, per gram of the silica particles. A lower limit of the content of the primary amine falling within these ranges makes it easier to control the particle size. The content of the primary amine in the silica particles is preferably 100 μmol or less, and more preferably 90 μmol or less, per gram of the silica particles. An upper limit of the content of the primary amine falling within these ranges enables the silica particles to become prone to deformation.

The content of the primary amine can be measured by the following method. Specifically, colloidal silica is centrifuged at 215000 G for 90 minutes, and then the supernatant is discarded. The solids are vacuum-dried at 60° C. for 90 minutes. 0.5 g of the obtained dry silica solids are weighed and added to 50 mL of a 1M aqueous sodium hydroxide solution, followed by heating at 50° C. for 24 hours with stirring to dissolve silica. The silica solution is analyzed by ion chromatography to determine the amine content. Analysis by ion chromatography is performed in accordance with JIS K0127.

The boiling point of the primary amine is preferably 85° C. or more, and more preferably 90° C. or more. A boiling point falling within these ranges is higher than the reaction temperature and suppresses vaporization during the reaction. The boiling point is preferably 500° C. or less, and more preferably 300° C. or less.

The silica particles contained in the colloidal silica according to the present invention preferably have a particle density of 1.95 or more, and more preferably 2.00 or more. A lower limit of the particle density falling within these ranges further increases the abrasiveness of the colloidal silica according to the present invention. The particle density is preferably 2.20 or less, and more preferably 2.16 or less. An upper limit of the particle density falling within these ranges further suppresses the formation of scratches on a polished object. The particle density can be measured by drying and hardening a sample on a hot plate at 150° C., keeping the sample in a furnace at 300° C. for 1 hour, and then measuring its particle density by a liquid-phase displacement method by using ethanol.

The density of silanol groups of silica particles in colloidal silica is preferably 1.9 groups/nm$^2$ or more, more preferably 2.0 groups/nm$^2$ or more, and still more preferably 2.1 groups/nm$^2$ or more. A lower limit of the density of silanol groups falling within these ranges further suppresses the formation of scratches on a polished object. The density of silanol groups is also preferably 5.0 groups/nm$^2$ or less, more preferably 4.5 groups/nm$^2$ or less, and still more preferably 3.4 groups/nm$^2$ or less. An upper limit of the density of silanol groups falling within these ranges further increases the abrasiveness of the colloidal silica according to the present invention. The density of silanol groups of silica particles in colloidal silica can be determined by the Sears method. The Sears method was performed with reference to the flowing: G. W. Sears, Jr., "Determination of Specific Surface Area of Colloidal Silica by Titration with Sodium Hydroxide," Analytical Chemistry, 28 (12), 1981 (1956). The measurement is performed by titration with a 0.1 mol/L aqueous sodium hydroxide solution by using a 1 wt % silica dispersion, and calculating the density of silanol groups in accordance with the following formula.

$$\rho = (a \times f \times 6022)/(c \times S)$$

In the formula, $\rho$ represents the density of silanol groups (the number of silanol groups/nm$^2$), a represents the amount of droplets of a 0.1 mol/L aqueous sodium hydroxide solution with a pH of 4 to 9 (mL), f represents the factor of a 0.1 mol/L aqueous sodium hydroxide solution, c represents the mass of silica particles (g), and S represents the BET specific surface area (m$^2$/g).

The colloidal silica according to the present invention is usable as a physical-properties improver in the areas of, for example, paper, fiber, and iron and steel, and also as an abrasive for electronic materials such as semiconductor wafers. The colloidal silica according to the present invention is also usable as an additive for filler, an external additive for toner, etc. by drying the colloidal silica into a powder form.

The silica particles in the colloidal silica preferably have on their surface an organic functional group represented by the following formula (1): —(CH$_2$)$_n$—R$^3$ (1). Due to the organic functional group represented by formula (1), aggregation of the colloidal silica is further suppressed. Due to the organic functional group represented by formula (1), interaction of the silica particles with other substances can be adjusted; for example, the abrasion performance of the silica particles as an abrasive can be adjusted by using electrostatic attraction or repulsion against a polished object, or the dispersibility can be enhanced when the silica particles are added to a polymer resin as a filler.

In formula (1), n represents an integer of 0 or more. n is preferably an integer of 1 or more. n is preferably an integer of 20 or less, more preferably 12 or less, still more preferably 6 or less, and particularly preferably 4 or less.

In formula (1), R$^3$ represents a functional group. R$^3$ can be any functional group, including cationic, anionic, polar, and non-polar functional groups. The colloidal silica according to the present invention preferably has, for example, an organic cationic functional group, an organic anionic functional group, an organic polar functional group, or an organic non-polar functional group on the surface of the silica particles, and more preferably has an organic cationic functional group or an organic anionic functional group.

The organic cationic functional group is not particularly limited, and includes an amino group.

The organic anionic functional group is not particularly limited, and includes a sulfo group and a carboxy group. Of these, a sulfo group is preferable.

The organic polar functional group and organic non-polar functional group are not particularly limited, and include a methyl group, an ethyl group, a propyl group, a hexyl group, a decyl group, a dodecyl group, a octadecyl group, a vinyl group, an epoxy group, a methacrylic group, and an acrylic group.

The organic functional group represented by formula (1) added to the surface of the silica particles in the colloidal silica can be confirmed by the following XPS measurement and zeta potential measurement.

XPS Measurement

Colloidal silica is centrifuged at 5° C. at 77,000 G for 90 minutes. The obtained precipitates are dried at 60° C. for 12 hours, and then ground with a mortar and a pestle, followed by drying under reduced pressure at 60° C. for 2 hours to prepare a dry powder.

The prepared dry powder is measured by X-ray photoelectron spectroscopy (XPS), and the peaks originating from the organic functional groups on the surface of particles are confirmed.

Zeta Potential Measurement

The zeta potential can be measured with a device using measurement principles such as electrophoretic light scattering, colloidal oscillating current, an electroacoustic method, and ultrasonic attenuation.

2. Method for Producing Colloidal Silica

The method for producing colloidal silica according to the present invention includes in series (1) step 1 of preparing a mother liquor containing an alkaline catalyst and water, (2) step 2 of adding an alkoxysilane to the mother liquor to prepare a mixed liquid, (3) step 3 of adding an alkaline catalyst to the mixed liquid to prepare a seed particle dispersion, and (4) step 4 of adding water and an organic solvent to the seed particle dispersion and then adding an alkoxysilane, wherein the alkaline catalyst is a primary amine.

Step 1

Step 1 is preparing a mother liquor containing an alkaline catalyst and water.

The alkaline catalyst may be a primary amine. The amine for use can be those explained in the Colloidal Silica section above.

The content of the amine in the mother liquor is preferably 0.30 mmol/kg or more, and more preferably 0.50 mmol/kg or more. A lower limit of the content of the amine falling within these ranges makes it easier to control the particle size. The content of the amine in the mother liquor is preferably 20.0 mmol/kg or less, and more preferably 15.0 mmol/kg or less. An upper limit of the content of the amine falling within these ranges enables the silica particles to become more prone to deformation.

The method for preparing the mother liquor can be any method. The mother liquor can be prepared by adding an alkaline catalyst to water by an ordinary method and stirring the mixture.

The pH of the mother liquor is, although not particularly limited to, preferably 9.5 or more, and more preferably 10.0 or more. A lower limit of the pH of the mother liquor falling within these ranges makes it easier to control the particle size. The pH of the mother liquor is preferably 12.0 or less, and more preferably 11.5 or less. An upper limit of the pH of the mother liquor falling within these ranges enables the silica particles to become more prone to deformation.

Step 2

Step 2 is adding an alkoxysilane to the mother liquor to prepare a mixed liquid.

The alkoxysilane is not particularly limited, and includes an alkoxysilane represented by the following formula (3)

$$Si(OR^2)_4 \qquad (3)$$

wherein $R^2$ represents an alkyl group.

In formula (3), $R^2$ represents an alkyl group. $R^2$ can be any alkyl group and is preferably a $C_{1-8}$ lower alkyl group, and more preferably a $C_{1-4}$ lower alkyl group. Specific examples of alkyl groups include a methyl group, an ethyl group, a propyl group, an isopropyl group, a butyl group, a pentyl group, and a hexyl group. The alkoxysilane represented by formula (3) is preferably tetramethoxysilane wherein $R^2$ is a methyl group (tetramethyl orthosilicate), tetraethoxysilane wherein $R^2$ is an ethyl group (tetraethyl orthosilicate), or tetraisopropoxysilane wherein $R^2$ is an isopropyl group; more preferably tetramethoxysilane wherein $R^2$ is a methyl group, or tetraethoxysilane wherein $R^2$ is an ethyl group; and still more preferably tetramethoxysilane.

The alkoxysilane may be used singly, or in a combination of two or more. The alkoxysilane may be added all at one time or in divided portions (e.g., two times or three times).

The amount of the alkoxysilane added in step 2 is not particularly limited. The molar ratio (s2/c1) of the amount of the alkoxysilane added s2 (mol) in step 2 to the amount of the alkaline catalyst c1 (mol) in the mother liquor is preferably 10 or more, more preferably 100 or more, and still more preferably 150 or more. A lower limit of the molar ratio s2/c1 falling within these ranges enables the seed particles to become even more prone to deformation. The molar ratio s2/c1 is preferably 8500 or less, and more preferably 8000 or less. An upper limit of the molar ratio s2/c1 falling within these ranges makes it unlikely for gelation to occur during the reaction.

The time period for adding an alkoxysilane is preferably 5 minutes or more, and more preferably 10 minutes or more. A lower limit of the time period for addition falling within these ranges makes it unlikely for gelation to occur during the reaction. The time period for adding an alkoxysilane is preferably 1000 minutes or less, and more preferably 600 minutes or less. An upper limit of the time period for addition falling within these ranges increases productivity and reduces production costs.

The pH of the mixed liquid is preferably 8.5 or less, and more preferably 8.0 or less. An upper limit of the pH of the mixed liquid falling within these ranges enables seed particles to become more prone to deformation. The pH of the mixed liquid is preferably 4.5 or more, and more preferably 4.9 or more. A lower limit of the pH of the mixed liquid falling within these ranges makes it unlikely for gelation to occur.

The temperature of the mixed liquid in step 2 is preferably 70° C. or more, and more preferably 75° C. or more. A lower limit of the temperature of the mixed liquid falling within these ranges makes it unlikely for gelation to occur during the reaction. The temperature of the mixed liquid is also preferably 95° C. or less, and more preferably 90° C. or less. An upper limit of the temperature of the mixed liquid falling within these ranges makes it likely for the vaporization of the alkoxysilane to be suppressed.

Step 3

Step 3 is adding an alkaline catalyst to the mixed liquid to prepare a seed particle dispersion.

The time period from the end of addition of the alkoxysilane until the start of addition of the alkaline catalyst in step 3 ("aging time" below) is preferably 0 minutes or more and 1500 minutes or less. The adjustment of aging time enables the control of the degree of deformation. An aging time period falling within these ranges provides silica particles with a desired aggregation ratio while ensuring productivity.

The temperature of the mixed liquid during aging is preferably 70° C. or more, and more preferably 75° C. or more. A lower limit of temperature falling within these ranges makes it easier to control the particle size. The temperature is also preferably 95° C. or less, and more preferably 90° C. or less. An upper limit of the temperature falling within these ranges makes it unlikely for gelation to occur.

The alkaline catalyst is a primary amine, and may be substituted. The amine for use can be those explained in the Colloidal Silica section above. The alkaline catalyst for use in step 3 may be the same as or different from the alkaline catalyst used in step 1.

The amount of the alkaline catalyst added in step 3 is not particularly limited. The molar ratio (s2/c3) of the amount of the alkoxysilane added s2 (mol) in step 2 to the amount of the alkaline catalyst added c3 (mol) in step 3 is preferably 500 or less, more preferably 400 or less, and still more preferably 300 or less. An upper limit of the molar ratio s2/c3 falling within these ranges makes it even easier to control the primary particle size of the silica particles. The molar ratio s2/c3 is also preferably 30 or more, and more preferably 35 or more. A lower limit of the molar ratio s2/c3 falling within these ranges further suppresses gelation. The alkaline catalyst may be added all at one time or added in divided portions (e.g., two times or three times).

The alkaline catalyst diluted with a solvent, such as water, may be added as a diluent in step 3.

The pH of the seed particle dispersion is preferably 8.0 or more, and more preferably 8.5 or more. A lower limit of the pH of the seed particle dispersion falling within these ranges makes it unlikely for gelation to occur. The pH of the seed particle dispersion is also preferably 12.0 or less, and more preferably 11.0 or less. An upper limit of the pH of the seed particle dispersion falling within these ranges makes it unlikely for silica to be dissolved.

The temperature of the seed particle dispersion when the alkaline catalyst is added in step 3 is, although not particularly limited to, preferably 70° C. or more, and more preferably 75° C. or more. A lower limit of the temperature falling within these ranges makes it easier to control the particle size. The temperature is also preferably 95° C. or less, and more preferably 90° C. or less. An upper limit of the temperature falling within these ranges makes it unlikely for gelation to occur.

Step 4

Step 4 is adding water and an organic solvent to a seed particle dispersion, and then adding an alkoxysilane. Step 4 may further optionally be adding an alkaline catalyst.

The seed particle dispersion may be the seed particle dispersion obtained in step 3, or a seed particle dispersion obtained in step 3.5, which is described later.

The amount of water added in step 4 is preferably 10 parts by mass or more, and more preferably 15 parts by mass or more, based on the amount of the seed particles contained in the seed particle dispersion taken as 1 part by mass. A lower limit of the amount of water falling within these ranges suppresses the additional formation of nuclear particles to thereby facilitate the growth of seed particles, and further increases the average secondary particle size of the silica particles. The amount of water added is also preferably 250 parts by mass or less, and more preferably 220 parts by mass or less, based on the amount of the seed particles contained in the seed particle dispersion taken as 1 part by mass. An upper limit of the amount of water falling within these ranges makes it even easier for the seed particles to grow. Water can be added all at one time or in divided portions (e.g., two times or three times).

The organic solvent for use in step 4 is, for example, a hydrophilic organic solvent. Specific examples include alcohols, such as methanol, ethanol, n-propanol, isopropanol, ethylene glycol, propylene glycol, and 1,4-butanediol; ketones, such as acetone and methyl ethyl ketone; and esters, such as ethyl acetate. The organic solvents may be used singly, or in a combination of two or more. The organic solvent may be added all at one time or in divided portions (e.g., two times or three times).

In particular, the organic solvent for use in the present invention is preferably an alcohol, more preferably methanol, ethanol, or isopropanol, still more preferably methanol, or ethanol, and particularly preferably methanol. This is because alcohols are readily displaced by water by heat distillation during water displacement, described later.

Additionally, the organic solvent for use is more preferably the same alcohol as the alcohol formed by hydrolysis of the alkoxysilane. For example, if tetramethyl orthosilicate is used as an alkoxysilane, hydrolysis of the silicate forms methanol in the reaction system; thus, methanol is used as an organic solvent. In this way, the solvent is easily recovered and reused.

The amount of the organic solvent added in step 4 is preferably 0.3 parts by mass or more, and more preferably 0.5 parts by mass or more based on the amount of the seed particles contained in the seed particle dispersion taken as 1 part by mass. A lower limit of the amount of the organic solvent added falling within these ranges suppresses the additional formation of nuclear particles to thereby facilitate the growth of the seed particles, and further increases the average primary particle size of the silica particles. The amount of the organic solvent added is also preferably 55.0 parts by mass or less, and more preferably 50.0 parts by mass or less based on the amount of the seed particles contained in the seed particle dispersion taken as 1 part by mass. An upper limit of the amount of the organic solvent falling within these ranges can suppress the reduction in particle density.

The alkoxysilane for use in step 4 may be an alkoxysilane having an organic functional group, as well as the alkoxysilane represented by formula (3), which is a tetraalkoxysilane that has no organic functional group, explained in the Step 2 section above.

The alkoxysilane having an organic functional group includes an alkoxysilane represented by the following formula (4) and an alkoxysilane represented by the following formula (5).

$(OR^2)_3Si[(CH_2)_n-R^3]$ (4)

$(OR^2)_2Si[(CH_2)_n-R^3][(CH_2)_n-R^4]$ (5)

In formulas (4) and (5), $R^2$ is defined in the same manner as $R^2$ of formula (3), and $R^3$ and $R^4$ are the same or different and defined in the same manner as $R^3$ of formula (1). n represents an integer defined in the same manner as n in formula (1).

Specific examples of alkoxysilanes represented by formula (4) or (5) include alkoxysilanes having one, or two or more organic functional groups in their molecule, such as methyltrimethoxysilane, dimethyldimethoxysilane, trimethylmethoxysilane, methyltriethoxysilane, dimethyldiethoxysilane, trimethylethoxysilane, phenyltrimethoxysilane, benzyltriethoxysilane, propyltrimethoxysilane, propyltriethoxysilane, diethoxymethylphenylsilane, allyltriethoxysilane, vinyltriethoxysilane, aminopropyltriethoxysilane, aminopropyltrimethoxysilane, N-2-(aminoethyl)-3-aminopropyltrimethoxysilane, N-2-(aminoethyl)-3-aminopropylmethyldimethoxysilane, N-phenyl-3-aminopropyltrimethoxysilane, N-trimethoxysilylpropyl-N,N,N-trimethylammonium chloride, 3-mercaptopropyltrimethoxysilane, 3-mercaptopropylmethyldimethoxysi lane, 3-sulfopropyltrimethoxysilane, 3-glycidoxypropyltrimethoxysilane, 3-methacryloxypropylmethyldimethoxysilane, 3-glycidoxypropyltriethoxysilane, 3-methacryloxypropylmethyldiethoxysilane, 3-methacryloxypropyltrimethoxysilane, 3-methacryloxypropyltriethoxysilane, and 3-acryloxypropyltrimethoxysilane; and chlorosilanes, such as trimethylchlorosilane and diethyldichlorosilane.

In step 4, the alkoxysilane can be used singly, or in a combination of two or more. The amount of the alkoxysilane having an organic functional group added is preferably 0.0004-fold mol to 0.03-fold mol, and more preferably 0.001-fold mol to 0.03-fold mol of the amount of the alkoxysilane represented by formula (3). An overly small proportion of the alkoxysilane having an organic functional group added may lead to fewer organic functional groups incorporated into the particles, resulting in a failure to add desired properties. An overly large proportion of the alkoxysilane having an organic functional group added may lead to increased secondary particle size, formation of aggregates, and gelation.

An alkoxysilane added in step 4 may be an alkoxysilane diluted with an organic solvent beforehand. The organic solvent for use in step 4 may be, for example, a hydrophilic organic solvent. Specific examples include alcohols, such as methanol, ethanol, n-propanol, isopropanol, ethylene glycol, propylene glycol, and 1,4-butanediol; ketones, such as acetone and methyl ethyl ketone; and esters, such as ethyl acetate. These organic solvents may be used singly, or in a combination of two or more. In particular, from the standpoint of industrial availability, the organic solvent for use in the present invention is preferably an alcohol, more preferably methanol or ethanol, and still more preferably methanol. This is because alcohols are readily displaced by water by heat distillation during water displacement. The organic solvent for use is more preferably the same alcohol as the alcohol formed by hydrolysis of alkyl silicate. For example, if tetramethyl orthosilicate is used as an alkoxysilane, hydrolysis of the silicate forms methanol in the reaction system; thus, methanol is used as an organic solvent. In this way, the solvent is easily recovered and reused.

The amount of the organic solvent added in step 4 is preferably 0-fold mass to 3-fold mass, and more preferably 0-fold mass to 1.5-fold mass of the total amount of the alkoxysilane added. An amount of the organic solvent added falling within these ranges suppresses the reduction in particle density.

The amount of the alkoxysilane represented by formula (3) added in step 4 is not particularly limited. The molar ratio (s4/sp4) of the amount of the alkoxysilane represented by formula (3) added s4 (mol) in step 4 to the amount of seed particles in the seed particle dispersion sp4 (mol) is preferably 3 or more. A lower limit of the amount of the alkoxysilane added falling within this range enables the production of colloidal silica more efficiently. The ratio s4/sp4 is preferably 30 or less, and more preferably 26 or less. An upper limit of the amount of the alkoxysilane added falling within these ranges makes it unlikely for nuclear particles to newly form during the reaction, and facilities the growth of the main particles. The molar ratio is based on the molecular weight of the seed particles defined as 60.08 g/mol.

The time period for adding an alkoxysilane in step 4 is preferably 5 minutes or more, and more preferably 10 minutes or more. A lower limit of the time period for addition falling within these ranges makes it unlikely for gelation to occur during the reaction. The time period for adding an alkoxysilane is also preferably 1000 minutes or less, and more preferably 600 minutes or less. An upper limit of the time period for addition falling within these ranges can further increase productivity and reduce production costs.

The pH of the seed particle dispersion when an alkoxysilane is added in step 4 is preferably 12.0 or less, and more preferably 11.5 or less. An upper limit of the pH falling within these ranges makes it unlikely for the silica particles to be dissolved. The pH of the seed particle dispersion when an alkoxysilane is added is also preferably 7.0 or more, and more preferably 7.5 or more. A lower limit of the pH falling within these ranges makes it unlikely for gelation to occur. In order to maintain the pH within these ranges, an alkaline catalyst may be added during the addition of an alkoxysilane.

The temperature of the seed particle dispersion when an alkoxysilane is added in step 4 is preferably 70° C. or more, and more preferably 75° C. or more. A lower limit of the temperature falling within these ranges makes it unlikely for gelation to occur during the reaction. The temperature of the seed particle dispersion when an alkoxysilane is added is also preferably 90° C. or less, and more preferably 85° C. or less. An upper limit of the temperature falling within these ranges makes it unlikely for the alkoxysilane to vaporize.

In step 4, an alkaline catalyst may be added. Adding an alkaline catalyst enables the pH of the reaction system to be adjusted so as to fall within a desired range. Adding an alkaline catalyst is also advantageous in that it makes it unlikely for nuclear particles to newly form during the reaction and facilitates the growth of the main particles. The alkaline catalyst in step 4 is a primary amine. The amine for use can be those explained in the Colloidal Silica section above. The alkaline catalyst for use in step 4 may be the same as or different from the alkaline catalyst used in step 1 or 3.

The alkaline catalyst in step 4 is added such that the pH of the seed particle dispersion when an alkoxysilane is added is preferably 7.0 to 12.0, and more preferably 7.5 to 11.5. The alkaline catalyst may be added all at one time or in divided portions (e.g., two times or three times). The alkaline catalyst is added typically when an alkoxysilane is added and/or before an alkoxysilane is added. As long as the pH of the reaction system when an alkoxysilane is added is within the ranges above, the alkaline catalyst may be added after an alkoxysilane is added. If the alkaline catalyst is added in divided portions (e.g., two times or three times), the alkaline catalyst may be added at two or more time points selected from the group consisting of the same time point as when an alkoxysilane is added, a time point before an alkoxysilane is added, and a time point after an alkoxysilane is added.

Step 3.5

The method for producing colloidal silica according to the present invention may further include, after step 3 and before step 4, step 3.5 of adding water to the seed particle dispersion obtained in step 3, and then adding an alkoxysilane to prepare a seed particle dispersion. In step 3.5, an alkaline catalyst and/or an organic solvent may be further optionally added. The seed particle dispersion prepared in step 3.5 can be subjected to step 4. Providing step 3.5 facilitates the growth of the seed particles, thereby further increasing the primary particle size.

The amount of water added in step 3.5 is preferably 10 parts by mass or more, and more preferably 15 parts by mass or more, based on the amount of the seed particles contained in the seed particle dispersion taken as 1 part by mass. A lower limit of the amount of water added falling within these ranges suppresses the additional formation of nuclear particles to thereby facilitate the growth of seed particles, and further increases the average secondary particle size of silica particles. The amount of water added is also preferably 250 parts by mass or less, and more preferably 220 parts by mass or less, based on the amount of the seed particles contained in the seed particle dispersion taken as 1 part by mass. An upper limit of the amount of water falling within these ranges makes it even easier for the seed particles to grow. Water may be added all at one time or in divided portions (e.g., two times or three times).

In step 3.5, an organic solvent may be added to the seed particle dispersion. The organic solvent is preferably added to the seed particle dispersion before an alkoxysilane is added. The organic solvent may be added all at one time or in divided portions (e.g., two times or three times).

The organic solvent for use in step 3.5 may be those explained in the Step 4 section above. The organic solvent for use in step 3.5 may be the same as or different from the organic solvent used in step 4.

The amount of the organic solvent added in step 3.5 is preferably 0.3 parts by mass or more, and more preferably 0.5 parts by mass or more, based on the amount of the seed particles contained in the seed particle dispersion taken as 1 part by mass. A lower limit of the amount of the organic solvent added falling within these ranges suppresses the additional formation of nuclear particles to thereby facilitate the growth of seed particles, and further increases the average primary particle size of silica particles. The amount of the organic solvent added is also preferably 55.0 parts by mass or less, and more preferably 50.0 parts by mass or less, based on the amount of the seed particles contained in the seed particle dispersion taken as 1 part by mass. An upper limit of the organic solvent added falling within these ranges can suppress the reduction in particle density.

In step 3.5, the alkoxysilane may be used singly, or in a combination of two or more. The alkoxysilane may be added all at one time or in divided portions (e.g., two times or three times). The alkoxysilane added in step 3.5 may be an alkoxysilane diluted with an organic solvent beforehand.

The alkoxysilane for use in step 3.5 may be those explained in the Step 4 section above. The alkoxysilane for use in step 3.5 may be the same as or different from the alkoxysilane used in step 2 or step 4.

The amount of the alkoxysilane added in step 3.5 is not particularly limited. The molar ratio (s3.5/sp3.5) of the amount of the alkoxysilane added s3.5 (mol) in step 3.5 to the amount of the seed particles contained in the seed particle dispersion sp3.5 (mol) is preferably 3 or more. A lower limit of the amount of the alkoxysilane added falling within this range enables a far more efficient production of colloidal silica. The molar ratio s3.5/sp3.5 is preferably 30 or less, and more preferably 26 or less. An upper limit of the amount of the alkoxysilane falling within these ranges makes it unlikely for nuclear particles to newly form during the reaction, and facilitates the growth of the main particles.

The time period for adding an alkoxysilane in step 3.5 is preferably 5 minutes or more, and more preferably 10 minutes or more. A lower limit of the time period for addition falling within these ranges makes it unlikely for gelation to occur during the reaction. The time period for adding an alkoxysilane is preferably 1000 minutes or less, and more preferably 600 minutes or less. An upper limit of the time period for addition falling within these ranges can increase productivity and reduce production costs.

The pH of the seed particle dispersion when an alkoxysilane is added in step 3.5 is preferably 12.0 or less, and more preferably 11.5 or less. An upper limit of the pH falling within these ranges makes it unlikely for silica particles to be dissolved. The pH of the seed particle dispersion when an alkoxysilane is added is preferably 7.0 or more, and more preferably 7.5 or more. A lower limit of the pH falling within these ranges makes it unlikely for gelation to occur. In order to maintain the pH within the ranges above, an alkaline catalyst may be added during the addition of an alkoxysilane.

The temperature of the seed particle dispersion when an alkoxysilane is added in step 3.5 is preferably 70° C. or more, and more preferably 75° C. or more. A lower limit of the temperature of the seed particle dispersion falling within these ranges makes it unlikely for gelation to occur. The temperature of the seed particle dispersion is also preferably 90° C. or less, and more preferably 85° C. or less. An upper limit of the temperature of the seed particle dispersion falling within these ranges makes it unlikely for the alkoxysilane to vaporize.

In step 3.5, an alkaline catalyst may be added to the seed particle dispersion. Adding an alkaline catalyst enables the pH of the reaction system to be adjusted so as to fall within a desired range. Adding an alkaline catalyst is also advantageous in that it makes it unlikely for nuclear particles to newly form during the reaction and facilitates the growth of the main particles. The alkaline catalyst in step 3.5 is a primary amine. The amine for use can be those explained in the Colloidal Silica section above. The alkaline catalyst for use in step 3.5 may be the same as or different from the alkaline catalyst used in step 1, 3, or 4.

The alkaline catalyst in step 3.5 is added such that the pH of the reaction system when an alkoxysilane is added is preferably 7.0 to 12.0, and more preferably 7.5 to 11.5. The alkaline catalyst may be added all at one time or in divided portions (e.g., two times or three times). The alkaline catalyst is added typically when an alkoxysilane is added and/or before an alkoxysilane is added. As long as the pH of the reaction system when an alkoxysilane is added is within the ranges above, the alkaline catalyst may be added after an alkoxysilane is added. If the alkaline catalyst is added in divided portions (e.g., two times or three times), the alkaline catalyst may be added at two or more time points selected from the group consisting of the same time point as when an alkoxysilane is added, a time point before an alkoxysilane is added, and a time point after an alkoxysilane is added.

The method for producing colloidal silica according to the present invention may further include, after step 4, the step of concentrating the colloidal silica. The concentration method is not particularly limited, and the colloidal silica may be concentrated by a known method. Examples of concentration methods include heat concentration at about 65 to 100° C., and concentration by ultrafiltration.

The concentration of silica particles in concentrated colloidal silica is, although not particularly limited to, preferably about 1 to 50 mass % based on the colloidal silica taken as 100 mass %.

In the method for producing colloidal silica according to the present invention, the colloidal silica obtained in step 4 or 5 contains an alcohol generated as a by-product during the reaction and the organic solvent added in step 3.5, 4, or 5. Thus, the method may include the step of distilling the organic solvent out of the system after step 4 or 5, or after the step of concentrating colloidal silica described above. The method for distilling an organic solvent out of the system is not particularly limited. An example for such methods is replacing the dispersion medium with pure water by adding pure water dropwise while heating the colloidal silica to maintain the volume at a constant level. Examples of other methods include a method of separating colloidal silica from the solvent by precipitation, separation, centrifugation, etc., and re-dispersing the colloidal silica in water; and a method of replacing the solvent with water by ultrafiltration.

Step 5

If the colloidal silica according to the present invention has the organic functional group represented by formula (1), the method for producing colloidal silica according to the present invention may further include, after step 4, step 5 of adding an alkoxysilane having an organic functional group.

In step 5, the alkoxysilane having an organic functional group for use can be the alkoxysilane having the organic functional group represented by formula (4) or (5).

If the organic functional group is an organic cationic functional group in step 5, examples of alkoxysilanes having a cationic functional group include aminopropyltrimethoxysilane, (aminoethyl)aminopropyltrimethoxysilane, (aminoethyl)aminopropyltriethoxysilane, aminopropyltriethoxysilane, aminopropyldimethylethoxysilane, aminopropylmethyldiethoxysilane, and aminobutyltriethoxysilane.

If the organic functional group is an organic cationic functional group, the amount of the alkoxysilane having an organic functional group added in step 5 is, although not particularly limited to, preferably 0.5 to 350 μmol, and more preferably 5.5 to 170 μmol, per gram of the solids of the colloidal silica before an alkoxysilane having an organic functional group is added. A lower limit of the amount of the alkoxysilane having an organic functional group added falling within these ranges makes the degree of modification of colloidal silica even more sufficient, provides modified colloidal silica that can be stably dispersed for a longer period of time, and can further increase electrostatic attraction or repulsion against a polished object due to the increased positive charge of colloidal silica under acidic conditions. An upper limit of the amount of the alkoxysilane having an organic functional group added falling within these ranges further suppresses an increase in secondary particle size, formation of aggregates, and gelation.

In step 5, if the organic functional group is an organic anionic functional group, in particular, a sulfo group, the alkoxysilane having an organic functional group is, for example, preferably an alkoxysilane having an organic functional group that contains a functional group chemically convertible to a sulfo group. Examples of such alkoxysilanes having an organic functional group include 1) an alkoxysilane having an organic functional group that contains a sulfonic acid ester group convertible to a sulfo group by hydrolysis, and 2) an alkoxysilane having an organic functional group that contains a mercapto group and/or a sulfide group convertible to a sulfo group by oxidation. Because the modification of colloidal silica surface with a sulfonic acid is performed in a solution, the latter, i.e., an alkoxysilane having an organic functional group that contains a mercapto group and/or a sulfide group, is preferably used in order to enhance modification efficiency.

Examples of alkoxysilanes having an organic functional group that contain a mercapto group include 3-mercaptopropyltrimethoxysilane, 2-mercaptopropyltriethoxysilane, 2-mercaptoethyltrimethoxysilane, and 2-mercaptoethyltriethoxysilane.

Examples of alkoxysilanes having an organic functional group that contain a sulfide group include bis(3-triethoxysilylpropyl)disulfide.

If the organic functional group is an organic anionic functional group, in particular, a sulfo group, the amount of the alkoxysilane having an organic functional group for use in step 5 is, although not particularly limited to, preferably 0.5 to 350 μmol, and more preferably 5.5 to 170 μmol, per gram of the solids of colloidal silica after the alkoxysilane having an organic functional group is added. A lower limit of the amount of the alkoxysilane having an organic functional group falling within these ranges further sufficiently stabilizes the zeta potential under acidic conditions. An upper limit of the amount of the alkoxysilane having an organic functional group added falling within these ranges further suppresses an increase in secondary particle size, the formation of aggregates, and gelation.

The methods for oxidizing a mercapto group or a sulfide group modifying the surface of silica particles include a method using an oxidant. Examples include nitric acid, hydrogen peroxide, oxygen, ozone, organic peracid (percarboxylic acid), bromine, hypochlorite, potassium permanganate, and chromic acid. Of these oxidants, hydrogen peroxide and organic peracid (peracetic acid, perbenzoic acid) are preferable from the standpoint of relatively easy handling and excellent oxidation yields. From the standpoint of by-products that form during the reaction, hydrogen peroxide is most preferably used.

The amount of the oxidant added is preferably 3-fold mol to 100-fold mol of the alkoxysilane having an organic functional group. The upper limit of the amount of the oxidant added is, although not particularly limited to, more preferably about 50-fold mol. In the colloidal silica and the alkoxysilane having an organic functional group, functional groups other than the functional groups oxidized (converted) into a sulfo group have a stable structure in an oxidation reaction, thereby suppressing the formation of by-products.

In step 5, the temperature at which an alkoxysilane having an organic functional group is added is, although not particularly limited to, preferably from room temperature (about 20° C.) to the boiling point. The reaction time period is, although not particularly limited to, preferably 10 minutes to 10 hours, and more preferably 30 minutes to 2 hours. The pH at which the alkoxysilane having an organic functional group is added is, although not particularly limited to, preferably 3 or more and 11 or less. A pH falling within this range further facilitates the reaction between the alkoxysilane having an organic functional group and the silica surface, and further suppresses self-condensation between the molecules of the alkoxysilane having an organic functional group. Additionally, a pH falling within this range requires a smaller amount of an acidic or basic substance for adjusting the pH, and stably retains the silica particles.

The alkoxysilane having an organic functional group is preferably diluted with an organic solvent and then added to colloidal silica. The use of the alkoxysilane having an organic functional group diluted with an organic solvent can suppress an increase in secondary particle size and the formation of aggregates. If an alkoxysilane having an organic functional group is diluted with an organic solvent, diluting with an organic solvent is performed, without particular limitation, such that the proportion of the alkoxysilane having an organic functional group is 0.1 to 100 mass %, and preferably 1 to 100 mass %. The organic solvent is, although not particularly limited to, preferably a hydrophilic organic solvent, including lower alcohols such as methanol, ethanol, isopropanol, and butanol.

The colloidal silica according to the present invention contains metallic impurities, such as sodium, potassium, iron, aluminum, calcium, magnesium, titanium, nickel, chromium, copper, zinc, lead, silver, manganese, and cobalt, preferably in an amount of 1 ppm or less. Due to the content of metallic impurities of 1 ppm or less, the colloidal silica according to the present invention can suitably be used in polishing electronic materials and other like materials.

The colloidal silica according to the present invention and the colloidal silica produced by the production method according to the present invention have a variety of applications such as abrasives and paper coating agents. An abrasive containing the colloidal silica is also encompassed in the scope of the present invention. The colloidal silica according to the present invention contains silica particles that have an average primary particle size of 33 nm or more, an aggregation ratio of 1.2 or more, a particle density of 1.95 or more, and a high content of alkoxy groups, with the proportion of the number of silica particles having an equivalent circle diameter of under 20 nm being less than 15%. The silica particles also contain primary amines and can be highly pure with a content of metal impurities, such as sodium, of 1 ppm or less. Thus, the colloidal silica is suitable for use, in particular, in abrasives for chemical mechanical polishing of semiconductor wafers.

EXAMPLES

The present invention will be described in detail below with reference to Examples etc. However, the present invention is not limited to the Examples etc.

Example 1

Step 1: 7500 g of pure water as a solvent was placed in a flask, and 0.38685 g of 3-ethoxypropylamine (3-EOPA) as an alkaline catalyst was added thereto to prepare a mother liquor. The pH of the mother liquor was 10.2.

Step 2: The mother liquor was heated to an internal temperature of 85° C., and 2740 g of tetramethyl orthosilicate was added dropwise to the mother liquor at a constant rate over a period of 120 minutes, while the temperature was adjusted to maintain the internal temperature, to prepare a mixed liquid.

Step 3: After stirring for 60 minutes, 50.124 g of 3-ethoxypropylamine (3-EOPA) was added to the mixed liquid to prepare a seed particle dispersion. The pH of the seed particle dispersion was 10.3.

Figure 1:
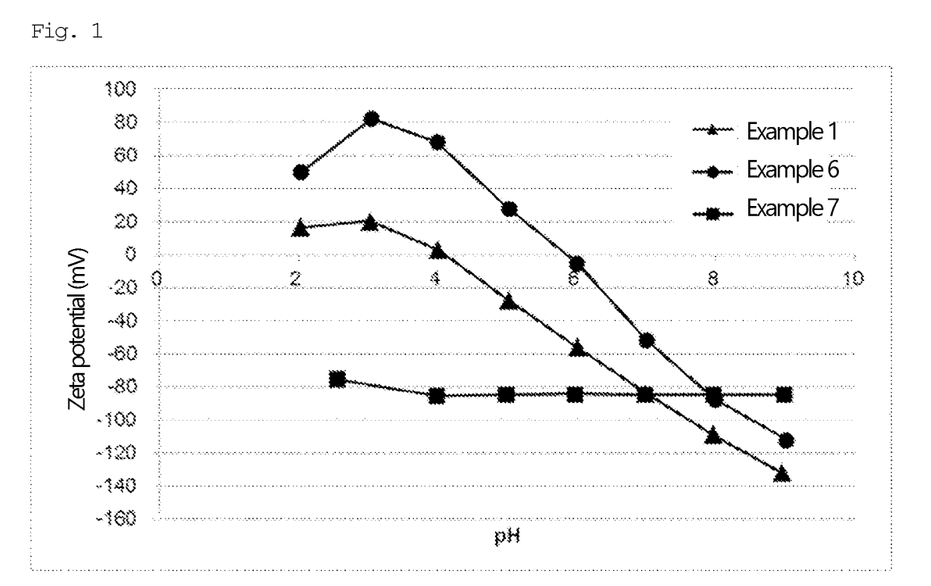
FIG. 1 is a graph showing the measurement results of zeta potential of the colloidal silica obtained in Examples 1, 6, and 7.

Step 4: 6061 g of pure water, 930 g of methanol, 581 g of the seed particle dispersion, and 8.761 g of 3-ethoxypropylamine (3-EOPA) were placed in another flask. Thereafter, the mixture was heated to an internal temperature of 80° C., and 2000 g of tetramethyl orthosilicate was added dropwise at a constant rate over a period of 360 minutes while the temperature was adjusted to maintain the internal temperature. After completion of the dropwise addition, stirring was performed for 15 minutes to prepare colloidal silica. Subsequently, the colloidal silica was collected in an amount of 800 mL as a base amount under ordinary pressure. Then, while feeding colloidal silica and keeping the volume constant, the collected colloidal silica was heated and concentrated so that the silica concentration was 20 wt %. Subsequently, while keeping the volume constant, the dispersion medium was replaced with 500 mL of pure water to distill off methanol, whereby colloidal silica was prepared. Table 1 shows the physical properties of the obtained colloidal silica, and FIG. 1 shows its zeta potential.

Example 2

6103 g of pure water as a solvent, 1142 g of methanol, 296 g of the seed particle dispersion obtained in Example 1 as silica particles serving as a core, and 10.148 g of 3-ethoxypropylamine (3-EOPA) as an alkaline catalyst were placed in a flask. Thereafter, the mixture was heated to an internal temperature of 80° C., and 2000 g of tetramethyl orthosilicate was added dropwise at a constant rate over a period of 360 minutes while the temperature was adjusted to maintain the internal temperature. After completion of the dropwise addition, stirring was performed for 15 minutes to prepare colloidal silica. Then, the obtained colloidal silica was collected in an amount of 800 mL as a base amount under ordinary pressure. While feeding colloidal silica and keeping the volume constant, the collected colloidal silica was heated and concentrated so that the silica concentration was 20 wt %. Subsequently, while keeping the volume constant, the dispersion medium was replaced with 500 mL of pure water to distill off methanol, whereby colloidal silica was prepared. Table 1 shows the physical properties of the obtained colloidal silica.

Example 3

Step 1: 6250 g of pure water as a solvent was placed in a flask, and 0.32238 g of 3-ethoxypropylamine (3-EOPA) as an alkaline catalyst was added thereto to prepare a mother liquor. The pH of the mother liquor was 10.2.

Step 2: The mother liquor was heated to an internal temperature of 80° C., and 3107.9 g of tetramethyl orthosilicate was added dropwise to the mother liquor at a constant rate over a period of 100 minutes, while the temperature was adjusted to maintain the internal temperature, to prepare a mixed liquid.

Step 3: After stirring for 15 minutes, 56.8680 g of 3-ethoxypropylamine (3-EOPA) was added to the mixed liquid to prepare a seed particle dispersion. The pH of the seed particle dispersion was 10.3.

Step 3.5: 5840 g of pure water and 1921 g of the seed particle dispersion were placed in another flask. Thereafter, the mixture was heated to an internal temperature of 80° C., and 2000 g of tetramethyl orthosilicate was added dropwise at a constant rate over a period of 360 minutes while the temperature was adjusted to maintain the internal temperature. After completion of the dropwise addition, stirring was performed for 15 minutes. Then, 36.6280 g of 3-ethoxypropylamine (3-EOPA) was added thereto to prepare a seed particle dispersion. The pH of this seed particle dispersion was 10.3.

Step 4: 4719 g of pure water, 665 g of methanol, and 2366 g of the seed particle dispersion obtained in step 3.5 as silica particles serving as a core were placed in another flask. Thereafter, the mixture was heated to an internal temperature of 80° C., and 2000 g of tetramethyl orthosilicate was added dropwise at a constant rate over a period of 360 minutes while the temperature was adjusted to maintain the internal temperature. After completion of the dropwise addition, stirring was performed for 15 minutes to prepare colloidal silica. Subsequently, the colloidal silica was collected in an amount of 2600 mL as a base amount under ordinary pressure. Then, while feeding colloidal silica and keeping the volume constant, the collected colloidal silica was heated and concentrated so that the silica concentration was 20 wt %. Subsequently, while keeping the volume constant, the dispersion medium was replaced with 2000 mL of pure water to distill off methanol, whereby colloidal silica was prepared. Table 1 shows the physical properties of the obtained colloidal silica.

Example 4

Step 1: 6250 g of pure water as a solvent was placed in a flask, and 0.32240 g of 3-ethoxypropylamine (3-EOPA) as an alkaline catalyst was added thereto to prepare a mother liquor. The pH of the mother liquor was 10.2.

Step 2: The mother liquor was heated to an internal temperature of 80° C., and 3729.5 g of tetramethyl orthosilicate was added dropwise to the mother liquor at a constant rate over a period of 120 minutes, while the temperature was adjusted to maintain the internal temperature, to prepare a mixed liquid.

Step 3: 68.0110 g of 3-ethoxypropylamine (3-EOPA) was diluted in pure water to a concentration of 20 mass %, and the resulting dilution water of amine was added to the mixed liquid over a period of 30 minutes to prepare a seed particle dispersion. The pH of the seed particle dispersion was 10.4.

Step 3.5: 5989 g of pure water and 1761 g of the seed particle dispersion were placed in another flask. Thereafter, the mixture was heated to an internal temperature of 80° C., and 2000 g of tetramethyl orthosilicate was added dropwise at a constant rate over a period of 360 minutes while the temperature was adjusted to maintain the internal temperature. After completion of the dropwise addition, stirring was performed for 15 minutes. Then, 10.0010 g of 3-ethoxypropylamine (3-EOPA) was added thereto to prepare a seed particle dispersion. The pH of this seed particle dispersion was 10.3.

Step 4: 4389 g of pure water, 1005 g of methanol, 2356 g of the seed particle dispersion obtained in step 3.5 as silica particles serving as a core, and 6.432 g of 3-ethoxypropylamine (3-EOPA) were placed in another flask. Thereafter, the mixture was heated to an internal temperature of 80° C., and 2000 g of tetramethyl orthosilicate was added dropwise at a constant rate over a period of 360 minutes while the temperature was adjusted to maintain the internal temperature. After completion of the dropwise addition, stirring was performed for 15 minutes to prepare colloidal silica. Subsequently, the colloidal silica was collected in an amount of 2700 mL as a base amount under ordinary pressure. Then, while feeding colloidal silica and keeping the volume constant, the collected colloidal silica was heated and concentrated so that the silica concentration was 20 wt %. Subsequently, while keeping the volume constant, the dispersion medium was replaced with 1350 mL of pure water to distill off methanol, whereby colloidal silica was prepared. Table 1 shows the physical properties of the obtained colloidal silica.

Example 5

Step 1: 7500 g of pure water as a solvent was placed in a flask, and 0.62300 g of 3-ethoxypropylamine (3-EOPA) as an alkaline catalyst was added thereto to prepare a mother liquor. The pH of the mother liquor was 10.4.
Step 2: The mother liquor was heated to an internal temperature of 85° C., and 2740 g of tetramethyl orthosilicate was added dropwise to the mother liquor at a constant drop rate over a period of 120 minutes, while the temperature was adjusted to maintain the internal temperature, to prepare a mixed liquid.
Step 3: After stirring for 60 minutes, 50.124 g of 3-ethoxypropylamine (3-EOPA) was added to the mixed liquid to prepare a seed particle dispersion. The pH of the seed particle dispersion was 10.3.
Step 4: 6061 g of pure water, 930 g of methanol, 581 g of the seed particle dispersion, and 8.761 g of 3-ethoxypropylamine (3-EOPA) were placed in another flask. Thereafter, the mixture was heated to an internal temperature of 80° C., and 2000 g of tetramethyl orthosilicate was added dropwise at a constant rate over a period of 360 minutes while the temperature was adjusted to maintain the internal temperature. After completion of the dropwise addition, stirring was performed for 15 minutes to prepare colloidal silica. Subsequently, the colloidal silica was collected in an amount of 800 mL as a base amount under ordinary pressure. Then, while feeding colloidal silica and keeping the volume constant, the collected colloidal silica was heated and concentrated so that the silica concentration was 20 wt %. Subsequently, while keeping the volume constant, the dispersion medium was replaced with 500 mL of pure water to distill off methanol, whereby colloidal silica was prepared. Table 1 shows the physical properties of the obtained colloidal silica.

Example 6

Colloidal silica (silica concentration: 20 mass %) was prepared in the same manner as in Example 1.
Step 5:
0.7 g of 3-ethoxypropylamine (3-EOPA) was added to 750 g of the prepared colloidal silica, and the pH was adjusted to 9. Then, a mixed liquid of 0.7 g of 3-aminopropyltrimethoxysilane and 74.1 g of methanol was added at room temperature. Subsequently, while keeping the volume constant, the dispersion medium was replaced with 200 mL of pure water to distill off methanol from the liquid, whereby colloidal silica containing silica particles whose surface was modified with an organic cationic functional group was prepared. FIG. 1 shows the zeta potential of the obtained colloidal silica.

Example 7

Colloidal silica (silica concentration: 20 mass %) was prepared in the same manner as in Example 1.
Step 5:
0.8 g of 3-ethoxypropylamine (3-EOPA) was added to 830 g of the prepared colloidal silica, and the pH was adjusted to 9. Subsequently, 9.9 g of 3-mercaptopropyltrimethoxysilane was added, followed by addition of 21.1 g of a 30% aqueous solution of hydrogen peroxide. Subsequently, while keeping the volume constant, the dispersion medium was replaced with 200 mL of pure water to distill off methanol from the liquid, and the resulting product was heated and refluxed for 3 hours, whereby colloidal silica containing silica particles whose surface was modified with an organic anionic functional group was prepared. FIG. 1 shows the zeta potential of the obtained colloidal silica.

Comparative Example 1

0.151 g of a 25% aqueous tetramethylammonium hydroxide (TMAH) solution was added to 1732 g of water, and the mixture was stirred to prepare a mother liquor. The mother liquor was heated to reflux. Further, tetramethyl orthosilicate was hydrolyzed to prepare a 9% aqueous silicic acid solution. Then, 346.5 g of the aqueous silicic acid solution was added dropwise to the mother liquor over a period of 3 hours under reflux, followed by refluxing for 30 minutes. Subsequently, 1.26 g of a 25% aqueous tetramethylammonium hydroxide (TMAH) solution was added dropwise to prepare a seed particle dispersion. Then, 2910 g of water was added to the seed particle dispersion, and the mixture was stirred, heated, and refluxed. Thereafter, 600 g of a mixture of water and methanol was extracted while 500 g of the 9% aqueous silicic acid solution and 1.21 g of a 25% aqueous tetramethylammonium hydroxide (TMAH) solution were added dropwise over a period of 2.5 hours. This procedure was performed 26 times to prepare colloidal silica. Table 1 shows the physical properties of the obtained colloidal silica. No primary amines were detected in the colloidal silica obtained in Comparative Example 1.

Comparative Example 2

0.365 g of a 25% aqueous tetramethylammonium hydroxide (TMAH) solution was added to 2000 g of water, and the mixture was stirred to prepare a mother liquor. The mother liquor was heated to 80° C. While the temperature of the mother liquor was maintained at 80° C., 228 g of tetramethyl orthosilicate was added dropwise over a period of 3 hours. Immediately after that, 2.92 g of a 25% aqueous tetramethylammonium hydroxide (TMAH) solution was added. While the temperature was maintained at 80° C., 228 g of tetramethyl orthosilicate and 3.19 g of a 25% aqueous tetramethylammonium hydroxide (TMAH) solution were added dropwise over a period of 3 hours. This procedure was performed 4 times to prepare colloidal silica. Table 1 shows the physical properties of the obtained colloidal silica. The colloidal silica obtained in Comparative Example 2 contained silica particles with a smaller aggregation ratio, compared to those of Examples 1 to 4, and no primary amines were detected.

Comparative Example 3

The effect of the addition of methanol was evaluated. Specifically, 6991 g of pure water as solvent was placed in a flask, and 581 g of the seed particle dispersion obtained in Example 1 as particles serving as a core, and 8.761 g of 3-ethoxypropylamine (3-EOPA) as an alkaline catalyst were added thereto to prepare a mother liquor. The pH of the mother liquor was 10.2. The mother liquor was heated to an internal temperature of 80° C., and 2000 g of tetramethyl orthosilicate was added dropwise to the mother liquor at a constant rate over a period of 360 minutes while the temperature was adjusted to maintain the internal temperature. After the completion of the dropwise addition, stirring was performed for 15 minutes to prepare a mixed liquid. In Comparative Example 3, no growth of the main particles was observed. The reason for this is that methanol was not added to the mother liquor, and due to this, the additional formation of nuclear particles (small particles) was not suppressed, which consequently inhibited the growth of the main particles. Table 1 shows the physical properties of the obtained colloidal silica.

The characteristics of the colloidal silica of the Examples and Comparative Examples obtained as described above were evaluated according the following methods.

Average Primary Particle Size

Colloidal silica was pre-dried on a hot plate and then heated at 800° C. for 1 hour to prepare a measurement sample. The BET specific surface area of the prepared measurement sample was measured. The average primary particle size (nm) of silica particles in the colloidal silica was calculated by using the value of 2727/BET specific surface area (m2/g), regarding the density of silica particles as 2.2.

Average Secondary Particle Size

Colloidal silica was added to a 0.3 wt % citric acid aqueous solution and homogenized to prepare a dynamic-light-scattering measurement sample. The secondary particle size of the measurement sample was measured by dynamic light scattering (ELSZ-2000S, produced by Otsuka Electronics Co., Ltd.).

Aggregation Ratio

The aggregation ratio was calculated in accordance with the following formula: average secondary particle size/average primary particle size.

Particle Density

The sample was dried and hardened on a hot plate at 150° C. and kept in a furnace at 300° C. for 1 hour. Then, the particle density was measured by a liquid-phase displacement method by using ethanol.

Amine Content

Colloidal silica was centrifuged at 215000 G for 90 minutes, and the supernatant was discarded. The solids were vacuum-dried at 60° C. for 90 minutes. 0.5 g of the obtained dry silica solids were weighed and added to 50 ml of a 1M aqueous sodium hydroxide solution, followed by heating at 50° C. for 24 hours with stirring to dissolve silica. The silica solution was analyzed by ion chromatography to determine the amine content. Ion chromatography analysis was performed in accordance with JIS K0127.

Amount of Alkoxy Groups

Colloidal silica was centrifuged at 215000 G for 90 minutes, and the supernatant was discarded. The solids were vacuum-dried at 60° C. for 90 minutes. 0.5 g of the obtained dry silica solids were weighed and added to 50 ml of a 1M aqueous sodium hydroxide solution, followed by heating at 50° C. for 24 hours with stirring to dissolve silica. The silica solution was analyzed by gas chromatography to determine the alcohol content, which was defined as the amount of alkoxy groups. The detector for use in gas chromatography was a flame ionization detector (FID). Gas chromatography analysis was performed in accordance with JIS K0114.

Proportion of the Number of Particles Having an Equivalent Circle Diameter of Less than 20 nm One hundred primary particles were observed with a scanning electron microscope (SEM: 50,000-times). Then, the number of primary particles having an equivalent circle diameter of under 20 nm was determined by image analysis, followed by calculating the proportion of the number out of the number of primary particles measured for their equivalent circle diameter by SEM. A proportion of less than 15% was evaluated as "A", while a proportion of 15% or more was evaluated as "B."

Density of Silanol Groups

The density of silanol groups of silica particles in colloidal silica can be determined by the Sears method. The Sears method was performed with reference to the following: G. W. Sears, Jr., "Determination of Specific Surface Area of Colloidal Silica by Titration with Sodium Hydroxide," Analytical Chemistry, 28(12), 1981 (1956). The measurement was performed by titration with a 0.1 mol/L aqueous sodium hydroxide solution by using a 1 wt % silica dispersion, and calculating the density of silanol groups in accordance with the following formula.

$$\rho = (a \times f \times 6022)/(c \times S)$$

In the formula, $\rho$ represents the density of silanol groups (the number of silanol groups/nm$^2$), a represents the amount of droplets of a 0.1 mol/L aqueous sodium hydroxide solution with a pH of 4 to 9 (mL), f represents the factor of a 0.1 mol/L aqueous sodium hydroxide solution, c represents the mass of silica particles (g), and S represents the BET specific surface area (m$^2$/g).

TABLE 1

| | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Primary particle size (nm) | 44 | 48 | 53 | 53 | 42 | 45 | 26 | 32 |
| Aggregation ratio | 2.0 | 2.1 | 2.3 | 2.6 | 1.5 | 1.7 | 1.6 | 2.4 |
| Particle density | 2.05 | 2.02 | 2.06 | 2.08 | 2.06 | 2.22 | 2.12 | 2.10 |
| Type of amine contained | 3-EOPA | 3-EOPA | 3-EOPA | 3-EOPA | 3-EOPA | TMAH | TMAH | 3-EOPA |
| Amine content (μmol/g) | 72 | 80 | 49 | 53 | 75 | 55 | 106 | 75 |
| Amount of alkoxy groups (ppm) | 5359 | 6503 | 7536 | 7672 | 6021 | 6679 | 13127 | 8691 |

TABLE 1-continued

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Proportion of the number of particles with an equivalent circle diameter of under 20 nm | A | A | A | A | A | A | A | B |
| Density of silanol groups (number of groups/nm$^2$) | 2.5 | 3.1 | 2.9 | 3.2 | 2.3 | 1.8 | — | — |

For the colloidal silica obtained in Examples 1, 6, and 7, zeta potential measurement and XPS measurement were performed according to the following methods.

Zeta Potential Measurement

The zeta potential of colloidal silica was measured with a measurement device that uses an ultrasonic attenuation method.

XPS Measurement

Colloidal silica was centrifuged at 5° C. at 77000 G for 90 minutes. The obtained precipitate was dried at 60° C. for 12 hours, and then ground with a mortar and a pestle, followed by drying under reduced pressure at 60° C. for 2 hours to prepare a dry powder.

The prepared dry powder was measured by XPS, and the peaks originating from the organic functional groups on the surface of particles were confirmed.

Figure 2:
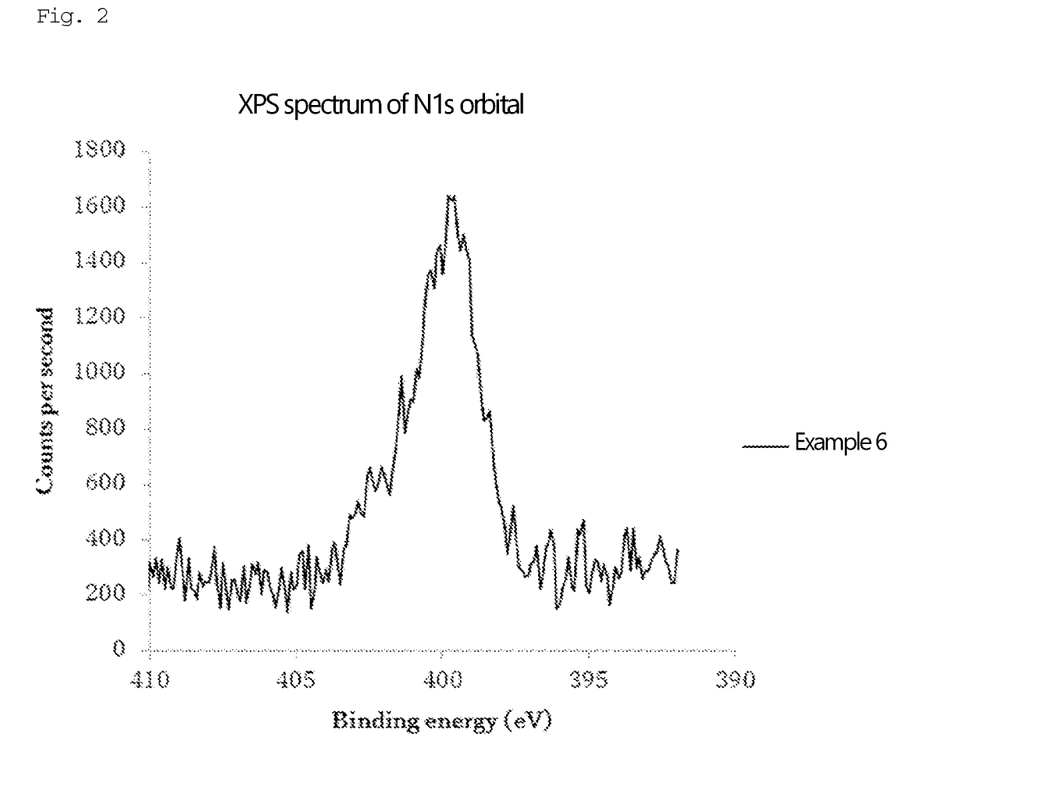
FIG. 2 is a graph showing XPS analysis results of the colloidal silica obtained in Example 6.
Figure 3:
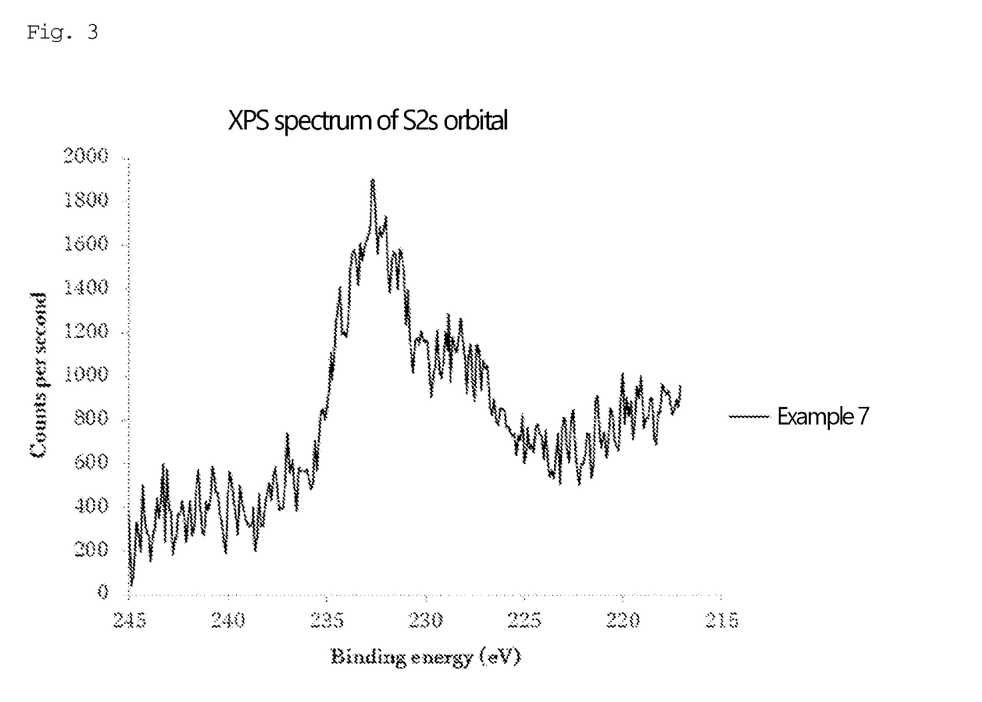
FIG. 3 is a graph showing XPS analysis results of the colloidal silica obtained in Example 7.

FIG. 1 is a graph showing the measurement results of zeta potential of the colloidal silica obtained in Examples 1, 6, and 7. FIG. 2 is a graph showing XPS analysis results of the colloidal silica obtained in Example 6, and FIG. 3 is a graph showing XPS analysis results of the colloidal silica obtained in Example 7.

FIG. 1 shows that the zeta potential of the colloidal silica obtained in Example 6 was positively shifted with respect to the zeta potential of the colloidal silica obtained in Example 1. In particular, the isoelectric point of Example 6 was 5 or more. Further, the XPS measurement results shown in FIG. 2 confirmed that N atoms were detected, indicating that an amino group, which is a cationic functional group, was added to the surface of silica particles.

FIG. 1 also shows that the zeta potential of the colloidal silica obtained in Example 7 was negatively shifted with respect to the zeta potential of the colloidal silica obtained in Example 1. In particular, the zeta potential of Example 7 was negative in the entire pH range of 3 to 9. Further, the XPS measurement results shown in FIG. 3 confirmed that S atoms were detected, indicating that a sulfo group, which is an anionic functional group, was added to the surface of silica particles.

The invention claimed is:

1. A colloidal silica comprising silica particles, wherein
   the silica particles have an average primary particle size of 33 nm or more, an aggregation ratio of 1.2 or more, and a particle density of 1.95 or more,
   the silica particles contain 1000 ppm by mass or more of alkoxy groups per gram of the silica particles,
   the proportion of the number of silica particles having an equivalent circle diameter under 20 nm is less than 15%, and
   the silica particles contain a primary amine in an amount of 5 μmol or more per gram of the silica particles.

2. The colloidal silica according to claim 1, wherein the silica particles have a particle density of 1.95 or more and 2.20 or less.

3. The colloidal silica according to claim 1, wherein the silica particles have an organic functional group on the surface, the organic functional group being represented by the following formula (1)

$$-(CH_2)_n-R^3 \qquad (1)$$

wherein n represents an integer of 0 or more, and $R^3$ represents a functional group.

4. The colloidal silica according to claim 1, wherein the silica particles have an organic cationic functional group on the surface.

5. The colloidal silica according to claim 4, wherein the silica particles have an amino group on the surface.

6. The colloidal silica according to claim 1, wherein the silica particles have an organic anionic functional group on the surface.

7. The colloidal silica according to claim 6, wherein the silica particles have a sulfo group on the surface.

8. A method for producing colloidal silica, the method comprising in series
   (1) step 1 of preparing a mother liquor containing an alkaline catalyst and water,
   (2) step 2 of adding an alkoxysilane to the mother liquor to prepare a mixed liquid,
   (3) step 3 of adding an alkaline catalyst to the mixed liquid to prepare a seed particle dispersion, and
   (4) step 4 of adding water and an organic solvent to the seed particle dispersion, and then adding an alkoxysilane,
   wherein the alkaline catalysts are a primary amine.

9. The production method according to claim 8, comprising, between step 3 and step 4,
   (3.5) step 3.5 of adding water to the seed particle dispersion obtained in step 3 and then adding an alkoxysilane thereto to prepare a seed particle dispersion.

* * * * *